3,268,573
BIS-(2,6-DICHLOROPHENYL ALKYL CARBONATES)
Henry Charles Godt, Jr., St. Louis, Mo., assignor to Monsanto Company, a corporation of Delaware
No Drawing. Filed Aug. 14, 1963, Ser. No. 301,971
9 Claims. (Cl. 260—463)

This invention relates to a novel class of organic compounds which are esters of carbonic acid. More particularly, this invention is concerned with a class of such compounds which are characterized as bis-alkyl carbonates wherein the carbonate moieties are separated by a halogenated aromatic bridge. The carbonates of this invention are found to possess useful and unexpected biological activity.

The novel carbonates can be represented by the following general formula:

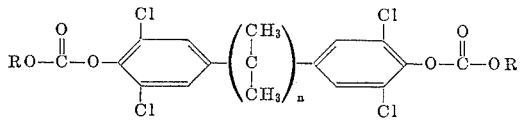

wherein R designates an alkyl group having from 1 to 8 carbon atoms, and $n$ is an integer from 0 to 1. As illustrative of the radicals represented by R are methyl, ethyl, n-propyl, isopropyl, n-butyl, isobutyl, sec.-butyl, tert.-butyl, n-amyl, isomayl, tert.-amyl, n-hexyl, isohexyl, 2-ethylbutyl, n-heptyl, 2,3-dimethylpentyl, 3-ethyl-2-pentyl, n-octyl, isooctyl, 2-ethylhexyl, diisobutyl, and the like.

The bis-alkyl carbonates of this invention can be prepared by reacting two mols of alkyl chloroformate with a mol of halogenated bisphenol. The reaction temperature employed in preparing the desired compounds will be primarily dependent upon the particular reactants employed. Although not essential to the preparation of the compounds of this invention, it should be noted that it is preferred to carry out the reaction of the chloroformate and the bisphenol in the presence of an inert organic solvent.

The invention will be more fully understood by reference to the following examples, which are set forth herein solely for purposes of illustration and are not to be construed as limiting the scope of said invention in any way.

Example 1

A suitable reaction vessel is charged with 0.1 mol of 4,4'-isopropylidene bis(2,6-dichlorophenol) and 600 ml. of pyridine. The mixture is stirred at 0–10° C. during the dropwise addition of 0.2 mol of ethyl chloroformate, and the resultant mixture is stirred overnight at room temperature. The pyridine solvent is then removed at a pot temperature of 40–50° C. (15 mm. Hg), after which the residue is hydrolyzed with 3 N NaOH and washed with ether.

The desired product is filtered from the ether-washed, hydrolyzed mixture. It is then washed successively with ether, cold NaOH and water. Upon drying there is obtained a 94% yield of 4,4'-isopropylidene bis(2,6-dichlorophenyl ethyl carbonate) as a white solid, M.P. 154–155° C.

Example 2

Following the procedure set forth in Example 1, n-butyl chloroformate is employed. There is obtained an 88% yield of 4,4'-isopropylidene bis(2,6-dichlorophenyl n-butyl carbonate) as a white solid, M.P. 93–94° C.

Example 3

Following the procedure set forth in Example 1, n-hexyl chloroformate is employed. There is obtained a 64% yield of 4,4'-isopropylidene bis(2,6-chlorophenyl n-hexyl carbonate) as a white solid, M.P. 81–82° C.

Example 4

Again following the procedure set forth in Example 1, the reactants are ethyl chloroformate and 2,2',6,6'-tetrachloro-4,4'-bisphenol. There is obtained an 89% yield of 2,2',6,6'-tetrachloro-4,4'-biphenylylene bis(ethyl carbonate) as a white solid, M.P. 223–224° C.

Example 5

Following the procedure set forth in Example 4, the bisphenol is reacted with n-butyl chloroformate. There is obtained an 81% yield of 2,2',6,6'-tetrachloro-4,4'-biphenylylene bis(n-butyl carbonate) as a white solid, M.P. 115–116° C.

Example 6

Following the procedure set forth in Example 4, the bisphenol is reacted with n-hexyl chloroformate. There is obtained an 84% yield of 2,2',6,6'-tetrachloro-4,4'-biphenylylene bis(n-hexyl carbonate) as a white solid, M.P. 104–105° C.

It will be apparent that the other and different alkyl homologues of the compounds of Examples 1 through 6 are prepared by employing the appropriate chloroformate.

The products of the present invention can be employed against a variety of undesirable organisms. For example, the compounds prepared in Examples 2 and 5 are found to be effective in the pre-emergent control of morning glory when applied at a rate of about 25 pounds per acre. The compound prepared in Example 3 is found to be effective in controlling the growth of undesirable broad leaf plants when applied to foliage in a 0.5% solution. Further, the compounds prepared in Examples 2 and 4 are found to be effective against cucumber leaf spot fungi when applied in a 0.1% solution, and the compound prepared in Example 6 is found to be effective in the control of tomato leaf spot fungi when applied in a 0.01% solution. Other compounds within the scope of this invention are found to display activity of a similar nature.

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A compound of the formula,

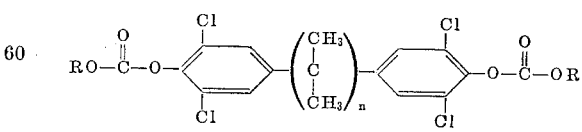

wherein R is alkyl of from 1 to 8 carbons, and $n$ is an integer from 0 to 1.

2. A compound of the formula,

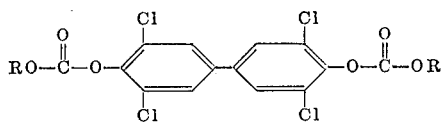

wherein R is alkyl of 1 to 8 carbons.

3. A compound of the formula,

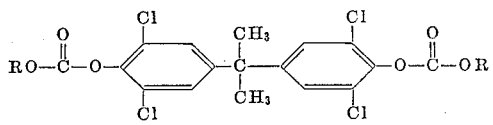

wherein R is alkyl of 1 to 8 carbons.

4. 4,4'-isopropylidene bis(2,6-dichlorophenyl ethyl carbonate).

5. 4,4'-isopropylidene bis(2,6-dichlorophenyl n-butyl carbonate).

6. 4,4'-isopropylidene bis(2,6-chlorophenyl n-hexyl carbonate).

7. 2,2',6,6'-tetrachloro-4,4'-biphenylylene bis(ethyl carbonate).

8. 2,2',6,6'-tetrachloro-4,4'-biphenylylene bis(n-butyl carbonate).

9. 2,2',6,6'-tetrachloro-4,4'-biphenylylene bis(n-hexyl carbonate).

References Cited by the Examiner
UNITED STATES PATENTS

| | | | |
|---|---|---|---|
| 2,455,652 | 12/1948 | Bralley et al. | 260—463 XR |
| 2,548,141 | 4/1951 | Bralley | 260—463 XR |
| 2,567,987 | 9/1951 | Baumgartner | 260—463 XR |

OTHER REFERENCES

Jenkins: J. Chem. Soc. (London), vol. of 1957, pp. 2729–2731.

CHARLES B. PARKER, *Primary Examiner.*

FLOYD D. HIGEL, *Assistant Examiner.*